United States Patent Office 3,252,353
Patented May 24, 1966

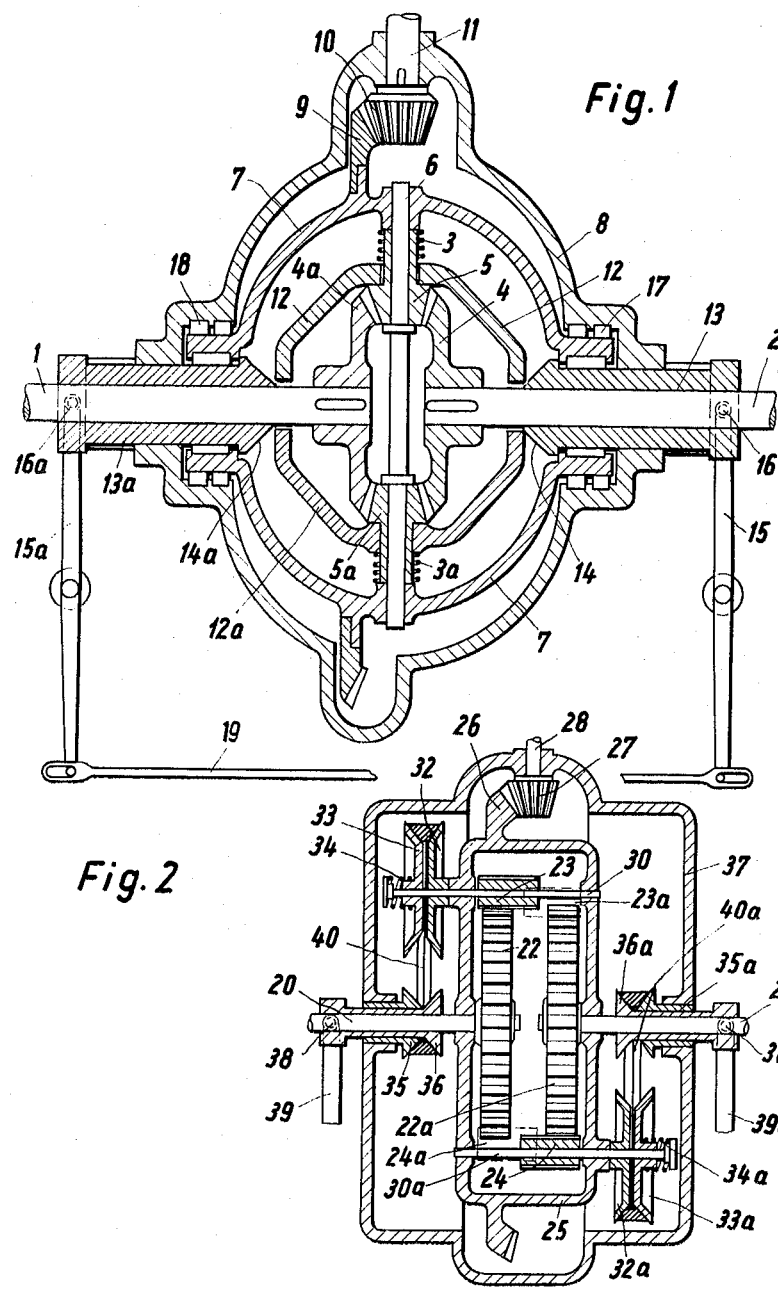
May 24, 1966  H. F. VON THUENGEN  3,252,353
STEERING GEAR FOR TRACKED VEHICLES
Filed March 4, 1963   3 Sheets-Sheet 1
Inventor:
HUBERT FREIHERR VON THUENGEN
by: Albert M Zalkind

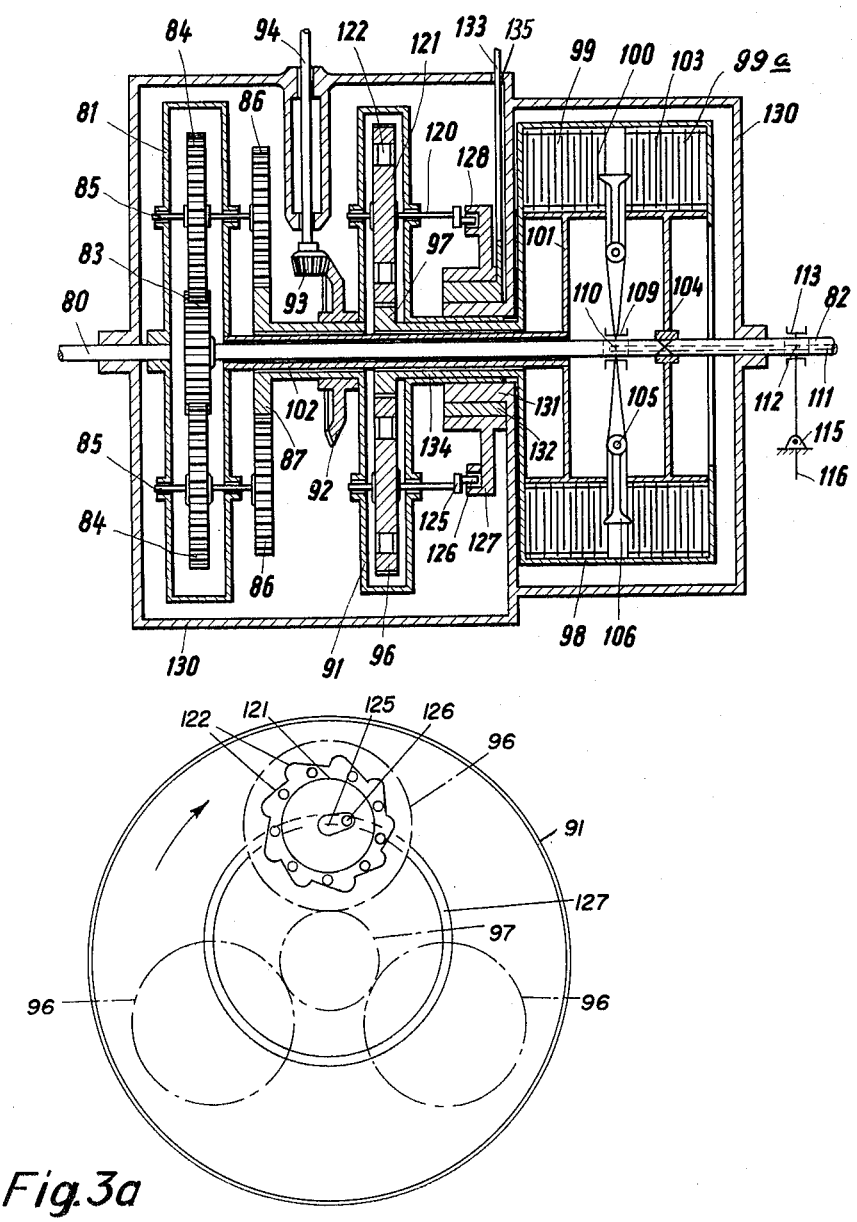

3,252,353
STEERING GEAR FOR TRACKED VEHICLES
Hubert Freiherr Von Thuengen, Friedrichshafen, Germany, assignor to Zahnradfabrik Friedrichshafen Aktiengesellschaft, Friedrichshafen, Germany
Filed Mar. 4, 1963, Ser. No. 263,090
Claims priority, application Germany, Mar. 9, 1962,
Z 9,278
16 Claims. (Cl. 74—720.5)

This invention relates to track type vehicles having sprocket wheels which drive tracks on each side of the vehicle and more particularly to means for effecting a variation between the track speeds for the purpose of steering the vehicle.

Prior art devices have been known which use brakes for the purpose of slowing up one track or the other in order to cause the vehicle to turn. Such brake type steering mechanisms result in considerable loss of power and also great wear of the brakes. The present invention has for its primary object the use of a steering mechanism which will produce a differential speed between the two tracks without, however, incurring the disadvantages of the prior art in the use of brakes.

Another object of the invention is to provide differential track speed which is infinitely variable.

Other objects and features of the invention will appear from the description which follows.

The concept of the invention is the utilization of a differential planetary gear mechanism which can be operator controlled so as to effect a difference in speed of the two tracks to thereby steer the vehicle. Such differential mechanism may take the form of a bevel gear type or a spur gear type, the sun gears being speed controlled by means which effect rotation of the planets about their own axes by use of an over-riding drive therefor. Such over-riding drive may be effected by operator controlled clutches wherein power is taken from either output side of the differential for the purpose of effecting a rotation of the planet gears in a respective direction to achieve a relative speed difference of the tracks. Thus, no loss of power is occasioned and, of course, no brake wear occurs.

In a preferred form of the invention, control of the speeds of the differential outputs is effected by a combination of pumps and motors in a hydraulic system of unique and compact construction.

A detailed description of the invention now follows in conjunction with the appended drawing in which:

FIGURE 1 is a plan cross section through a mechanism incorporating the principles of the invention;

FIG. 2 is a plan cross section through a modified mechanism;

FIG. 3 is a plan cross section through another modification of the invention;

FIG. 3a is a diagrammatic layout in plan of some of the components of FIG. 3.

Figure 4:
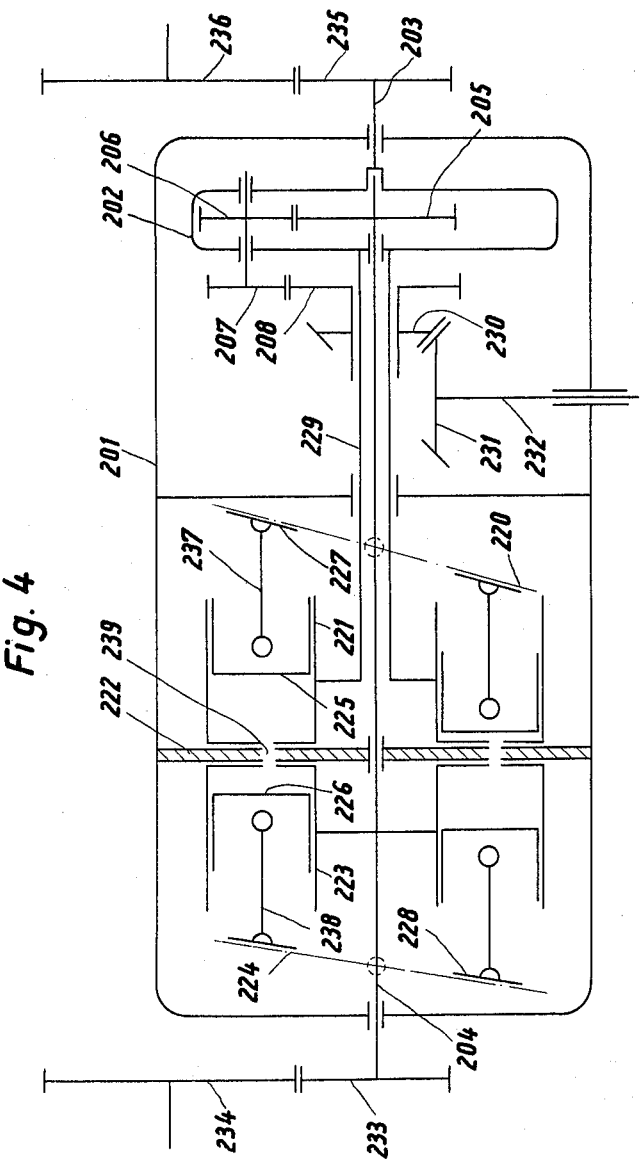
FIG. 4 is a diagrammatic plan of a still further modification of the invention.

Referring now to FIG. 1, there is disclosed a pair of output shafts 1 and 2 which will be understood to be connected to sprocket wheels of the tracks at the sides of a vehicle. The shaft 1 is keyed to a bevel gear 4a and the shaft 2 is keyed to a bevel gear 4 wherein the bevel gears mesh with planetary pinions 5 and 5a carried on a stub shaft 6. Surrounding the stub shaft of each of the pinions is a frictional cup; thus, the cup 12 is mounted on and keyed to the pinion 5, and the cup 12a is mounted on and keyed to the pinion 5a. The cups are slidable in the direction of the axes of their respective pinions and are resiliently biased toward each other by respective compression springs 3 and 3a.

The compression springs react against suitable bosses of the differential housing 7 having the integral bevel gear 9 rotated by the pinion 10 of the transmission drive input shaft 11.

The several components are all housed within the casing 8 which will be understood to be fixed to the vehicle and which has suitable bearings 17 and 18, which rotatively support the differential housing 7. Passing through the ends of the housing are frictional steering control elements 13 and 13a which are non-rotatively supported but which can reciprocate on the common axis of the output shafts 1 and 2. Such reciprocation may be manually effected by means of levers 15 and 15a suitably pivoted at 16 and 16a to the elements 13 and 13a. Such levers have fixed pivots at about their central points, as shown, and a manually operable rod 19 connecting at the outer ends of the levers can be axially shifted in one direction or the other to move either of the conical surfaces 14 or 14a of the friction control elements 13 and 13a, respectively, between the spaced edges of the cups 12 and 12a.

In ordinary driving, without steering, the differential gearing acts in a conventional manner and the conical surfaces 14 and 14a do not engage the edges of the cups 12 and 12a. However, when it is desired to steer the vehicle, either of the output shafts 1 or 2 is made to move faster than the other depending upon the direction of steering desired. In such case, shifting of the rod 19 will cause either of the conical surfaces 14 or 14a to be forced between the friction cups 12 and 12a, thus spreading them apart axially against the respective springs 3 and 3a. Owing to the fact that the conical surfaces do not rotate, the frictional reaction will be to cause rotation of cups 12 and 12a in opposite directions. Thus, the conical surface 14 will cause rotation of the cups each in a respective direction while the conical surface 14a will cause rotation of the cups but in opposite direction from that caused by the surface 14. Such rotation of the cups will cause relative rotation of the pinions 5 and 5a in a relatively opposite sense but depending on the direction of shift of the rod 19. The rotation of the pinions 5 and 5a will cause the bevel gears 4 and 4a to have relative rotation with respect to each other whence the output shafts will likewise have relative rotation with respect to each other, one shaft going faster than the other. Accordingly, a steering effect is produced.

The farther that the cones are pushed between the cups 12 and 12a, the greater will be the relative rates of rotation of the cups and, accordingly, the greater steering effect or, in other words, the smaller the radius of steering curve.

Referring now to FIG. 2, a construction is shown wherein the output shafts 20 and 21 are secured to respective spur gears 22 and 22a driven by respective pinions 23 and 24 carried within differential housing 25 having an integral bevel gear 26 meshing with a pinion 27 driven by the input transmission shaft 28. Pinion 23 is keyed to a shaft 30 on which is keyed the two halves of a split pulley sheave, 32 and 33. The sheave portion 33 is biased by a compression spring 34 toward the sheave portion 32 and a V-belt 40 passes around the sheave and around another sheave consisting of a pair of sheave portions 35 and 36 wherein the sheave portion 35 is fixed to the housing 37 and the sheave portion 36 can be reciprocated via a joint 38 and an arm 39, which corresponds to the arm 15a of FIG. 1 and will be understood to be operable by a rod such as the rod 19 of FIG. 1. Normally, there is no drive frictional engagement between belt 40 and the sheaves in the position shown. However, when the sheave portion 36 is moved toward the sheave portion 35, there is a take-up on the belt pulling it into the sheave portions 32 and 33 and, thus, effecting rotation of shaft 30 as the housing 25 rotates about the axes of the output shafts 20 and 21. The sheave portions 35 and 36 do not rotate but merely serve to frictionally engage the belt 40 whence to effect rotation of the sheave consisting of the portions 32 and 33. This rotation will cause rotation of pinion 23 on shaft 30 which will in turn drive the gear 22, superimposing a rotation thereon in addition to that which it already has by virtue of rotation of the housing 25.

In a similar manner, a sheave consisting of the sections 32a and 33a is keyed to the shaft 30a and connects via a V-belt 40a to a sheave consisting of the sections 35a and 36a, the system being in all respects identical with that described for the sheaves which control output shaft 20; thus, output shaft 21 is similarly controlled, the tensioning of belt 40a occurring against reaction of spring 34a by operation of swivel connection 38a through lever 39a, to thereby change the speed of gear 22a by an overriding drive effected by pinions, such as 24.

Accordingly, the speed of the gears 22 and 22a may be changed relative to each other depending on the shifting of the levers 39 and 39a whence the relative speeds of the output shafts may be varied to effect steering. Normally, with no tension in the belts, the vehicle moves straight ahead.

The pinions 23a and 24a interconnect gears 22a and 22 with pinions 23 and 24, respectively, as indicated by dashed lines on the drawing, such arrangement being required for spur gear differentials of the kind shown, and it will be understood that pinions 23a and 24a have suitable shafts (not shown) supporting them in the housing 25.

In the form of the invention shown in FIGURES 3 and 3a, a housing 130 supports the vehicle output driven shafts 80 and 82 which receive power from the transmission shaft 94, power being transmitted to the output shafts via the bevel gear 92 meshing with bevel pinion 93 on shaft 94. Gear 92 is keyed to the elongated hub of a sun gear 87 meshing with planet pinions 86. Shaft 80 is connected to a differential housing 81 for rotation therewith. Planet gears 84 mesh with sun gear 83 in housing 81 and are keyed in pairs with planet gears 86 on respective shafts 85 carried by housing 81. Sun gear 83 is keyed to driven shaft 82.

The arrangement just described yields the usual differential action to permit the output shafts 80 and 82 to rotate with respect to each other.

In order to effect relative rotation of the output shafts for steering control, a ratchet driven differential mechanism is provided which comprises a differential housing 91 integrally rotative with sun gear 87 and with gear 92, and which carries therethrough a plurality of shafts 120 for planetary clutch hubs 121 (FIG. 3a). The periphery of the hubs 121 carries one-way clutch mechanisms as best seen in FIG. 3a, such mechanisms being designated generally with the reference character 122 and comprising rollers coacting with cam surfaces within the annulus of planet gears or gear rims 96 which mesh with a normally stationary sun gear 97 integral with a sleeve 134 which is in turn integral with a friction clutch housing 98.

The several shafts 120 terminate in crank throws 125 having crank pins 126 which protrude into a circular slot 127 suitably formed in a disc 128 which is carried on an adjustable eccentric sleeve 132 in turn carried on a fixed eccentric collar 131 which may be part of the housing 130. The arrangement is such that the eccentric sleeve 132 may be manually rotated by a lever 133 extending outwardly of the housing via a slot 135 and movable into and out of the plane of the paper to vary the eccentricity of the disc 128 from a position to where it is concentric with the axis of the output driven shafts to a predetermined eccentric maximum position, for a purpose to be hereinafter described. It should be noted at this time, however, that in one direction of rotation about their axes, the planetary gears or rims 96, along with their shafts 120, are locked, but overrun in the opposite direction, due to the one-way clutch devices, and can thus intermittently drive gear 97.

The friction clutch housing 98 has slidably keyed thereto, in the usual manner, sets of friction discs 99, 99a, arranged on each side of clutch engaging or actuating levers 106. Coacting disc sets 100 and 103 of friction rings are slidably keyed on a carrier 101 which is integrally connected by a tubular shaft 102 with the differential casing 81.

A steering control arrangement is provided wherein a manually operable lever 116 oscillatable about a fixed pivot 115 can actuate a slidable sleeve 113 on shaft 82 connected to a pin 112 extending through an axial slot in the shaft and connected to a rod 111 extending slidably within the shaft and fastened to a pin 110 which connects with slidable sleeve 109 through another axial slot for shifting the sleeve 109 to the left or to the right for engagement of either friction ring set 100 or 103 with the respective sets 99, 99a. The levers 106 are each engaged by slidable sleeve 109 and rock on pivots, such as 105, suitably supported by the disc carrier 101 which is keyed via an integral radial flange 104 to shaft 82.

From the above description, it will be understood that when lever 133 is adjusted so as not to provide any eccentricity of the disc 128, the crank throws 126 will simply slide in the groove 127 and they will have no rotational effect on the clutch hubs 121. Also, if at this time lever 116 is in neutral position, sun gear 97 and clutch housing 98 are stationary and gear rims 96 roll on gear 97, the clutches 122 being overrunning in the rotational direction shown in FIG. 3a for housing 91. If, however, the disc 128 is made eccentric with respect to the axis of the drive shafts by adjustment of lever 133, then the crank throws 126 will oscillate once per rotation of housing 91 about the axes of their respective shafts 120 (due to the eccentric position of groove 127) and this will cause a clockwise and counter-clockwise partial rotation of the clutch hubs 121, each time housing 91 rotates, which housing rotates continuously driven by bevel gear 92.

The repetitive clockwise and counter-clockwise rotation of hubs 121 as they planet around sun gear 97 results, during the counter-clockwise operation of the oscillation, in a ratcheting drive on the hubs 121, but with overrunning during the clockwise phase of their oscillation. Thus, the counter-clockwise phase imparts intermittent rotational drive to the hubs 121 to effect intermittent rotation of sun gear 97, which intermittent rotation is synchronized with shafts 80 and 82. Thus, clutch housing 98 is rotated intermittently with gear 97. If, now, lever 116 is swung in one direction or the other so as to effect engagement of either clutch set 100 or 103 with its respective coacting set 99, 99a, in housing 98, an additional rotational effect to shaft 80 or 82 is imparted, set 100 effecting intermittent acceleration of shaft 80, and set 103 effecting acceleration of shaft 82, selectively. This effects steering left or right, and in a degree depending upon the amount of eccentricity provided by the lever 133.

While levers 116 and 133 may be separately manipulated, it will, of course, be understood that a suitable unifying mechanism could be provided to couple these levers so that the operator need handle but a single lever.

FIGURE 4 shows a preferred form of the invention using a hydrostatic drive for effecting relative difference in speeds of the planet pinions of a differential to effect steering. In this instance, a fixed casing 201 has a rotative differential housing 202 therein to which is connected an output shaft 203 which rotates with the housing 202. Extending into the housing 202 is the other output shaft 204 keyed to a sun gear 205 in turn meshing with a planet gear 206 which is integrally rotative with another planet gear 207 meshing with another sun gear 208 integrally secured on a tubular shaft with a bevel gear 230 meshing with another bevel gear 231 carried on input shaft 232.

The gears 233 and 234 are driven by output shaft 204, gear 234 being understood to be coupled to a track sprocket. In a similar manner, gears 235 and 236 drive the sprocket of the other track via output shaft 203. The differential housing 202 is integrally rotated with a tubular shaft 229 integrally connected with a cylinder block 221 that carries pistons, such as 225, having piston rods, such as 237, connected to a ring 227 which bears slidably in the course of rotation of the cylinder block against a non-rotative ring 220. The ring 220 will be understood to be suitably mounted so that its angularity with respect to the shaft 204 can be adjusted. Thus, as the cylinder block rotates, the angularity of ring 220 determines the stroke of the pistons in that cylinder block. In a similar manner, a rotative cylinder block 223 is coupled to the shaft 204 and rotates therewith. Pistons such as 226 are carried in cylinder block 223 and have connecting rods 238 pivotally coupled to a ring 228 which has a sliding rotative engagement with a non-rotative ring 224 similar to the ring 220, in that it can be adjusted as to angularity with respect to the shaft 204 to determine the stroke of the pistons in cylinder block 223 as the block rotates.

A fixed wall 222 is disposed intermediate the cylinder blocks and is provided with a series of slots 239 so that as the pistons on each side of the wall reciprocate, fluid in the respective cylinders may be moved back and forth through the slots.

In operation, when the rings 220 and 224 are in planes which are parallel and normal to the axis of shaft 204, the pistons in the cylinder blocks have no stroke and, provided that both tracks are equally loaded, the shafts 203 and 204 turn at the same rate of speed, effecting straight ahead driving via the sun gears and planets and housing 202. Further, as long as the two rings are maintained parallel to each other, even though set at an angle to shaft 204, their outputs and inputs as to liquid transfer remain the same via the slots 239 and neither cylinder block drives the other to produce any differential in speed between the shafts 203 and 204. This is due to the fact that the speeds of the two cylinder blocks are always at an inverse ratio to their volume of feed performance. If, however, the rings are set at unequal angles but sloping in the same general direction, then the piston strokes of the respective cylinder blocks will become unequal, the greater inclination of the plate producing a greater stroke in accordance with the conventional understanding of the action of wobble plates or swash plates. Thus, as shown in FIG. 4, the angle of the plate 220 is slightly greater than that of the plate 224. Therefore, the stroke of the pistons 225 is greater than that of the pistons 226. Accordingly, the volumetric displacement on the pumping stroke will be greater for the cylinder block 221 than that for the cylinder block 223. This affects speeding up of the rotation of cylinder block 223 due to the fact that the speeds of the two cylinder blocks are always at an inverse ratio to their volume of feed performance. The speeding up of the cylinder block 223 speeds up the rotation of output shaft 204 so that the track on that side is driven faster causing turning of the vehicle. Stated conversely, cylinder block 221 is acting as a fluid pump while cylinder block 223 is functioning as a fluid motor. Precisely, the reverse effect can be achieved by adjusting the plate 224 to a sharper angle with respect to the shaft 204 than the angle of plate 220. In such case, fluid will be forced into the cylinders of block 221 and, thus, that cylinder block acts as a motor to speed up the tubular shaft 229 to give faster rotation to shaft 203, achieving steering in the other direction. The diagram does not show construction and engineering detail, but the principles of swash plates are well known and the action can be readily understood from such principles. It will be understood that the cylinder blocks rotate slidably against the fixed wall 222 and suitable means provided to effect the necessary seal therebetween so that fluid will shift back and forth between the cylinder blocks without undue leakage. The slots 239 could be a series of closely spaced bores, or they could be elongated arcuate slots, the material between the bores or the slots not being wide enough to effect any undesirable degree of flow hampering.

It should be noted that one output shaft will always be accelerated to the same degree as the other shaft is decelerated. If either ring 220 or 224 is set in a plane normal to the axis of shaft 204, the respective cylinder block cannot act as a motor or a pump and the track associated with such cylinder block remains stationary, in which case the vehicle moves around the stationary track. Should the plates 220 and 224 be set at an angle sloping toward each other, the tracks will rotate in opposite directions and the vehicle will rotate on its own standing area. As in the other modifications described, the construction of FIG. 4 is self-powered in the sense that relative rotation of the output shafts to effect steering is by means which derives its power from the output shafts themselves. In the modification just described, the hydrostatic motor-pump unit does not accomplish the drive of the vehicle but only transmits power for steering purposes. This portion of the transmitted power is zero for straight ahead drive. The power provided for driving the vehicle straight ahead is transmitted purely mechanically which is an advantage in view of the fact that the efficiency of hydrostatic transmissions is low.

Having thus described my invention, I am aware that various changes may be made without departing from the spirit thereof and, therefore, do not seek to be limited to the precise illustrations herein given, except as set forth in the appended claims.

I claim:

1. A steering mechanism for track type vehicles and the like, comprising drive means and a differential device connected thereto having respective planetary pinion means, and having elements connected to output shafts of said vehicle for drive thereof, and means for effecting differential relative rotation of said pinion means with respect to each other by selectively connecting said pinion means to said drive means whereby said relative rotation of said pinion means effects relative rotation of the output shafts to a degree determined by the speed of said drive means.

2. In a device for effecting steering of track type vehicles and the like, a drive means for said vehicle, a differential mechanism having output shafts and being connected to said drive means, means for selectively effecting relative rotation of said output shafts with respect to each other comprising elements of said differential mechanism connected to respective shafts, said differential mechanism also comprising members disposed for deriving power from said drive means and also having elements for differentially and simultaneously varying the drive speeds thus received by said members, said elements comprising a fixed element and means engaging said fixed element with said other elements to effective relative speed thereof in the same direction, said elements comprising planetary gearing, wherein said relative speed is selectively controllable to control the steering of said vehicle for a given curvature corresponding to the speed of said drive means.

3. A steering mechanism for track type vehicles and the like, comprising a vehicle drive means and further comprising a pair of driven shafts and a differential mechanism for transmitting drive to each of said shafts, and comprising means for effecting a differing rotational speed of said shafts to effect vehicle steering, said latter means comprising gears keyed to said shafts and a respective planetary pinion meshing with each gear, and means for selectively coupling said pinions to said drive means.

4. A steering mechanism for steering track type vehicles and the like, said mechanism comprising a pair of output shafts, a power shaft and differential means connected to said shafts whereby said shafts may have drive power and relative rotation with respect to each other while being power driven, and steering control means for selectively imparting power to said differential means to selectively accelerate said shafts to effect vehicle steering, said steering control means having a coupling means to couple additional power derived from said power shaft for imparting acceleration to said differential means.

5. In a mechanism as set forth in claim 4, said output shafts being coaxial, said differential means comprising a differential gear arrangement having a pair of gears keyed to respective output shafts, a pair of planetary pinions and a carrier therefor, said power shaft being connected for transmitting power to said carrier, said coupling means comprising a drive element keyed to each of said pinions and rotative therewith, and comprising non-rotational elements selectively engageable with said drive elements on opposite sides of the rotational axis of said output shafts to effect relative rotation of said pinions whereby to effect relative rotation of said gears and output shafts.

6. A steering mechanism as set forth in claim 5, said coupling means comprising drive elements keyed to and rotative with said pinions, and comprising means engageable with said drive elements for effecting opposite directions of rotation of said drive element to effect relative rotation of said pinions, gears, and output shafts.

7. A steering mechanism as set forth in claim 4, said differential means comprising a pair of gears keyed to respective shafts, a pair of pinions intermediate said gears and a carrier therefor, means connecting said power shaft to said carrier for rotation therewith, said steering control means comprising a frictional drive element keyed to each of said pinions and slidable with respect thereto and having oppositely facing rims, a frictional reaction member having a conical end slidable on each output shaft and wherein the conical end of each said member may be engaged with said rims to effect opposite directional relative rotation of said drive members and respective pinions whereby said gears and said output shafts are correspondingly driven with relative rotational speed to effect steering.

8. A steering mechanism as set forth in claim 4, said differential means comprising a gear keyed to each of said shafts, pinions meshing with said gears and a carrier for said pinions and said power shaft being connected to rotate said carrier, said coupling means comprising: a pulley system connected with each of said pinions, said pulley system comprising a pulley keyed to each pinion and a belt engageable with each pulley for effecting rotation of the respective pinion to provide relative rotational speed of said gears and said output shafts, and nonrotative means for selectively effecting tension in said belts to drive the respective pinion.

9. A steering mechanism as set forth in claim 4, said differential means comprising a differential device having a housing connected to one output shaft and a sun gear connected to the other output shaft, said coupling means comprising: a ratchet drive selectively connectable to either of said output shafts to impart rotational speed thereto, said ratchet drive comprising a planetary ratchet arrangement of planet gears and a sun gear, said sun gear being intermittently rotatable by said planet gears, and means for imparting oscillatory rotation to said planet gears about their own axes to drive said latter sun gear, and means for selectively connecting said latter sun gear to said housing or to said first mentioned sun gear.

10. A steering mechanism as set forth in claim 9, said planetary ratchet arrangement further comprising a housing rotated continuously by said power shaft, wherein said means for imparting said oscillatory rotation comprises overrunning clutches on which are mounted respective planet gears, said clutches having hubs wherein oscillation of said hubs about their own axes imparts rotational motion to said planet gears and thus to said sun gear only in one direction of rotational motion of said hubs, said hubs having cranks, and adjustable eccentric means engageable with said cranks for effecting said oscillatory rotation of said hubs, said hubs being carried within said last-named housing and rotative therewith.

11. A steering mechanism for steering track type vehicles and the like, said mechanism comprising a pair of output shafts, a power shaft and differential means connected to said shafts whereby said shafts may have drive power and relative rotation with respect to each other while being power driven, and steering control means for selectively imparting power to said differential means to selectively accelerate said shafts to effect vehicle steering, said steering control means having a coupling means to couple additional power derived from said power shaft for imparting acceleration to said differential means, said coupling means having a non-rotative manually adjustable element disposed to effect a reaction to support steering power transmittal from said power shaft to said differential means.

12. In a device as set forth in claim 11, said differential means comprising a pair of differential devices having corresponding planet gears locked for interdependent rotation, one such device having a housing connected to one output shaft, and a sun gear in said housing connected to the other output shaft, the other such differential device having a sun gear disposed and connected to be driven by said power shaft.

13. A steering mechanism for steering track type vehicles and the like, said mechanism comprising a pair of output shafts, a power shaft and differential means connected to said shafts whereby said shafts may have drive power and relative rotation with respect to each other while being power driven, and steering control means for selectively imparting power to said differential means to selectively accelerate said shafts to effect vehicle steering, said steering control means having a coupling means to couple additional power derived from said power shaft for imparting acceleration to said differential means, said differential means comprising a pair of differential devices having corresponding planet gears locked for interdependent rotation, one such device having a housing connected to one output shaft, and a sun gear in said housing connected to the other output shaft, the other such differential device having a sun gear disposed and connected to be driven by said power shaft.

14. In a device as set forth in claim 13, each of said output shafts being connected to an adjustable variable fluid displacement drive comprising a rotary cylinder block, means connecting said blocks for exchange of fluid therebetween whereby either block can serve as a pump and the other as a motor depending on the adjustment of relative fluid displacement, and means for effecting such adjustment.

15. In a device as set forth in claim 14, said cylinder blocks each comprising a radial array of cylinders about respective output shafts, said output shafts being coaxial, and the axes of said cylinders being parallel to said output shafts, and pistons reciprocal in said cylinders.

16. A device as set forth in claim 15, said means for effecting variable displacement adjustment comprising a ring for each block, and means for positioning said rings at a predeterminned relative angularity with respect to said output shafts and to each other, said rings being operatively connected to said pistons to determine the stroke thereof.

References Cited by the Examiner

UNITED STATES PATENTS

| | | | |
|---|---|---|---|
| 2,833,161 | 5/1958 | Fossati | 74—710.5 |
| 2,930,257 | 3/1960 | Christenson | 74—720.5 |
| 3,039,327 | 6/1962 | Breting | 74—720.5 |
| 3,081,647 | 3/1963 | Blenkle | 74—710.5 |

DAVID J. WILLIAMOWSKY, *Primary Examiner.*

DON A. WAITE, *Examiner.*

L. H. GERIN, *Assistant Examiner.*